(12) United States Patent
Lloyd

(10) Patent No.: US 6,453,846 B2
(45) Date of Patent: Sep. 24, 2002

(54) METHOD OF APPLYING BEDDING ON THE FLOOR OF A POULTRY REARING BARN AND FOR RECYCLING OR DISPOSING OF SPENT BEDDING

(75) Inventor: Paul D. Lloyd, Goldsboro, NC (US)

(73) Assignee: Rapac, Inc., Oakland, TN (US); a part interest ( * ) Notice: Subject to any disclaimer, the term of this patent is extended or adjusted under 35 U.S.C. 154(b) by 0 days.

(21) Appl. No.: 09/761,141

(22) Filed: Jan. 16, 2001

(51) Int. Cl.[7] .............................................. A01K 1/015
(52) U.S. Cl. ...................................... 119/171; 119/28.5
(58) Field of Search ................................. 119/171, 172, 119/173, 174, 28.5

(56) References Cited

U.S. PATENT DOCUMENTS

| | | | |
|---|---|---|---|
| 3,765,371 A | * 10/1973 | Fisher | ........................ 119/171 |
| 4,525,410 A | * 6/1985 | Hagiwara et al. | ........... 424/411 |
| 4,708,294 A | 11/1987 | Endom | |
| 5,002,014 A | * 3/1991 | Albin | ........................ 119/28.5 |
| 5,014,650 A | * 5/1991 | Sowle et al. | ................. 119/171 |
| 5,362,776 A | * 11/1994 | Barenberg et al. | ........ 106/164.4 |
| 5,662,065 A | * 9/1997 | Bandimere et al. | ........ 119/28.5 |
| 5,675,850 A | * 10/1997 | Schmitt | ....................... 128/845 |
| 6,058,883 A | 5/2000 | Robbins | |
| 6,196,156 B1 | * 3/2001 | Denesuk et al. | ........... 119/28.5 |
| 6,286,456 B1 | * 9/2001 | Michaelis | ................... 119/28.5 |

FOREIGN PATENT DOCUMENTS

| | | | | |
|---|---|---|---|---|
| GB | 2100569 | * | 1/1983 | ................. 119/171 |
| JP | 210536 | * | 7/1992 | ................. 119/171 |

* cited by examiner

Primary Examiner—Yvonne R. Abbott
(74) Attorney, Agent, or Firm—David A. Tamburro

(57) ABSTRACT

A poultry rearing barn having its floor covered by bedding including a plurality of lightweight expanded polystyrene chips. After use, the dirty chips may be cleaned to remove waste manure and the cleaned chips may be reused again as bedding. Alternatively, the dirty chips and waste manure may be burned to generate electricity.

9 Claims, 1 Drawing Sheet

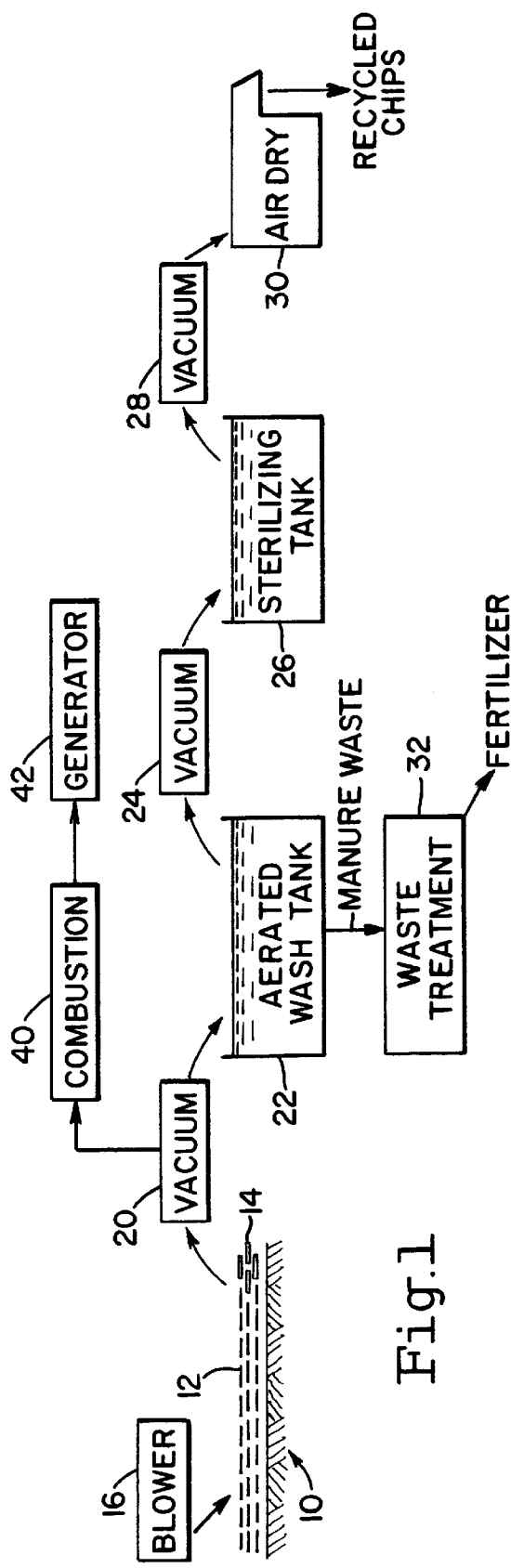
Fig.1
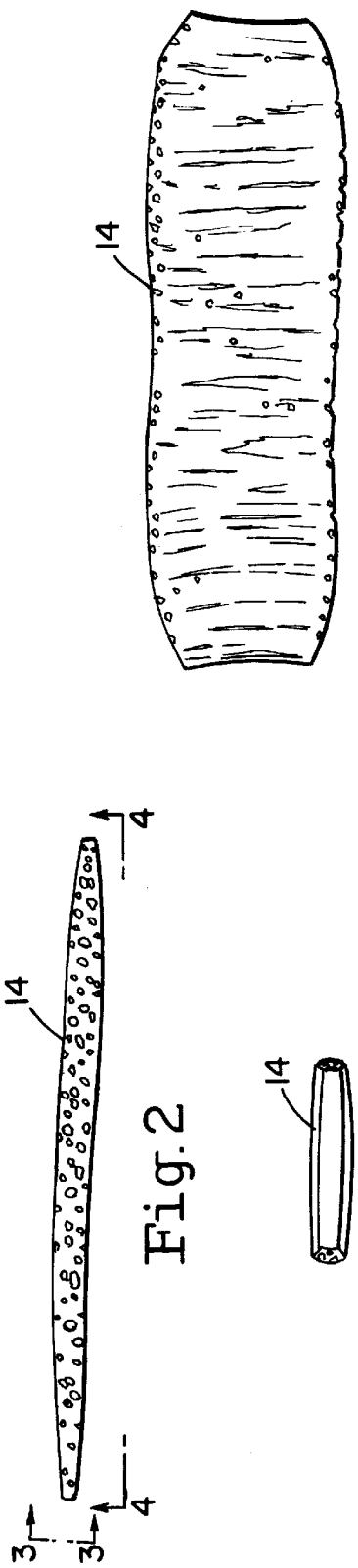
Fig.4
Fig.2
Fig.3

METHOD OF APPLYING BEDDING ON THE FLOOR OF A POULTRY REARING BARN AND FOR RECYCLING OR DISPOSING OF SPENT BEDDING

BACKGROUND OF THE INVENTION

This invention relates generally to poultry rearing barns and the floor bedding used therein, and more particularly, to novel bedding material which may be cleaned and recycled for reuse or may be burned after use to generate heat and electricity.

Raising poultry such as chickens or turkeys is a major industry in the United States, particularly in Southern areas where below freezing temperatures are rare. A typical poultry barn can be about forty feet wide by six hundred feet long and usually includes a roof and open sides. The floor of the poultry raising area is simply compacted and leveled earth extending the length and width of the barn.

It is the usual custom to provide a bedding of wood shavings or chips on the floor of the barn at a depth of several inches, for example three inches deep. Sawdust, peanut shells, corn husks, and rice shells have also been used as bedding material.

In such barns approximately 22,000 baby chicks may be raised over a growing period of about six to seven weeks, and about 12,000 turkey chicks may be raised over a growing period of about 13 weeks. During those growing periods, the manure droppings and waste from the birds are deposited on the wood chips. At the end of one or more growing cycles, the spent bedding of wood chips is customarily pushed by the blade of a bulldozer to a location where they can be hauled away from the barn and spread on the farmer's field as fertilizer. However, in recent years, governmental bodies have become concerned about contamination of the soil, nearby streams, and water supplies due to the high concentrations of nitrogen and phosphorus in the manure waste collected on the woodchips. Consequently, those government bodies have reduced the amount of spent bedding which could be spread on the farmer's fields by as much as one half. As a result, the farmer now needs either twice as much land on which to deposit the spent bedding or can only raise about half as many birds. Either situation is devastating to the farmer financially.

The farmer is confronted with another problem and that is that the times for emptying the barns of waste bedding and spreading that waste in the fields as fertilizer is limited to a small window in the spring just before the vegetable growing period starts, and in the fall, between harvest time and frost. If either of those time periods is missed by the farmer, he has no economical way of disposing of that spent bedding.

During use the bedding of wood chips creates another problem. In the early weeks of the growing cycle the droppings penetrate the top layer of the chips down to a depth to about ½ inch to 1 inch of the bedding and are absorbed by the upper layer of chips. As the top layer dries, the manure droppings then continue to build up on top of the chips to a thickness of a few inches so that as the birds grow the feet of the birds rest in the manure and are subject to disease caused by the bacteria in the manure. The feet of the birds are a valuable commodity and they are lost when they become infected. Moreover, because of the manure build up some birds die during the growing cycle, and they have to be disposed of and become a major problem for farmers.

Thus, there is a need for a bedding material which can be used in the poultry barn and which eliminates the problems associated with the conventional wood chips. The invention described hereinbelow was developed to satisfy that need.

SUMMARY OF THE INVENTION

Accordingly, the primary object of this invention is to construct the bedding on the floor of a poultry barn of a novel material which, after use in one or more bird growing cycles, may be cleaned of manure and used again in the poultry barn.

Still another object of this invention is to provide the above novel bedding wherein the novel material after use in one or more bird growing cycles may be burned to produce heat and electricity.

Still another object of the invention is to provide the above novel bedding constructed from lightweight heated and expanded polystyrene chips which can be conveniently blown onto the poultry barn floor to ready the floor for another bird growing cycle. At the end of a growing cycle, the chips and manure waste collected thereon may be quickly and conveniently vacuumed from the floor. Thus, the process of applying new or recycled polystyrene chips onto the floor at the beginning of a cycle and of removing the chips and waste at the end of a cycle is greatly enhanced, hence reducing the amount of time and money required to complete that process.

Another object of the invention results in the provision of the above novel bedding wherein the polystyrene chips are manufactured from recycled polystyrene material of low melt flow. The chips are formed by first extruding the polystyrene material into a particular shape, for example a rectangular cross section, cutting the material to form individual elements of a given length, and then heating and expanding those elements to form the blown lightweight polystyrene chips of a desired size and density.

The use of the novel polystyrene chips affords advantages over and overcomes the problems associated with the conventional woodchips. The lightweight polystyrene chips may be quickly and easily blown onto the floor of the barn to form a bedding of about three or more inches thick. The individual chips tend to be randomly oriented with respect to each other in overlapping relationship to form a total bedding thickness of about three to four inches. In operation, the manure droppings from the birds, which tend to be viscous in nature, are not absorbed by the polystyrene chips, but rather tend to run off the surface of the chips, downwardly between adjacent chips, to substantially the bottom of the bedding. As the end of the growing period approaches, the manure droppings gradually build up in the bedding towards the top layer of chips, but there is no substantial build up of manure above the top layer of the polystyrene chips. Consequently, the birds are subjected to far less disease and the feet of the birds encounter far less infection, with both of these results producing substantial economic benefits to the farmer.

After completion of the growing cycle, the lightweight polystyrene chips and the manure collected thereon are quickly and easily vacuumed from the floor of the barn and may be dispensed of in two ways. In the first way, the waste manure is washed from the surface of the chips and the chips may be sanitized and then recycled to the barns as fresh bedding. The manure waste removed from the chips can be suitably treated and then spread upon the farmer's fields as fertilizer. Recycling of the polystyrene chips reduces the costs of forming the bedding in the barns and also substantially reduces the amount of material waste which is deposited in the farmer's fields. Thus, it is much easier for the farmer to comply with current governmental regulations without having to decrease the number of birds he raises or increase the amount of property needed to dispose of the waste.

The second way to dispose of the polystyrene chips and the manure collected thereon is to burn the chips and manure in a way so as to generate electricity. Testing has proved that the chips and waste burn extremely hot and clean and are capable of generating heat and electricity. Furthermore, the ash from the burning may then be used as fertilizer to be spread in the fields. Again, this method allows the farmer to maintain his number of barns and birds being raised.

Thus, it is readily apparent that using polystyrene chips is extremely environmentally friendly, since the chips themselves are formed initially from recycled polystyrene material of low melt flow, since the polystyrene chips are easily blown in and vacuumed from the floor of the barns, and since the way in which the chips collect the bird droppings and avoids the buildup of waste manure on the top layer of the chips reduces disease and produces much healthier birds, all to the benefit of the farmer.

Other objects and advantages of the invention will become apparent from reading the following detailed description of the invention wherein reference is made to the accompanying drawings.

BRIEF DESCRIPTION OF THE DRAWINGS

FIG. 1 schematically illustrates the placement of the novel polystyrene elements or chips on the floor of a poultry rearing barn for use as bedding in bird growing cycles and, after completion of a growing cycle, the manner in which those chips and waste manure collected thereon may be cleaned for subsequent reuse back in the barn or may be burned to generate electricity;

FIG. 2 is a side elevation view of a typical polystyrene chip which may be used in forming the bedding of the poultry barn;

FIG. 3 is an end view of the polystyrene chip taken along line 3—3 of FIG. 2, and;

FIG. 4 is a bottom view of the polystyrene chip taken along line 4—4 of FIG. 2.

DETAILED DESCRIPTION OF THE INVENTION

Conventional poultry barns as described above include earthen floors 10 on which a bedding material 12 of about three to four inches thick is spread on the floor 10 to preserve the floor by collecting the manure droppings from the thousands of birds being grown within the barn. In the invention, the bedding 12 is formed by a plurality of lightweight expanded polystyrene chips 14 such as the generally rectangular chip illustrated in FIGS. 2, 3, and 4. For example, that chip is solid and may be about ¼ to 5/16 inches thick, about 1 inch wide, and about 3½ to 4 inches long.

Chips 14 are manufactured from recycled polystyrene material of low melt flow. The material is heated and extruded through a die and then cut to a length to form individual elements of predetermined dimensions. Those polystyrene elements are then heated and expanded in a hot air environment to form the lightweight polystyrene chips illustrated for example in FIGS. 2, 3, and 4. The blown polystyrene chips 14 typically have a density of about 0.65 to 0.75 pounds per cubic foot, in contrast to the density of the wood chips which is about 2 pounds per cubic foot.

Because of this, the chips 14 can be quickly and easily blown onto floor 10 by a blower 16 to quickly spread the chips in random orientation with respect to each other to form the bedding 12. Chips 14 absorb little or no moisture and have a somewhat slippery outer surface. Consequently, as the manure droppings from the birds fall onto the chips, the droppings tend to run off the top layer of chips and dribble downwardly through the various layers of the inches thick bedding substantially to the bottom of the bedding. Over the growing time cycle of the birds, the manure slowly builds up from the bottom towards the top of the bedding within the complete thickness of the bedding itself. However, there is essentially no build up of manure waste on the top layer of chips 14, thus the birds feet remain out of the manure and are not subject to infections or disease. As mentioned above, one of the most valuable parts of the birds are the feet and producing disease free feet is very economically beneficial to the farmer.

The polystyrene chips 14 are very strong and stable but yet are somewhat flexible and spongy which is also very beneficial to the feet of the birds and promotes healthy disease free birds.

Chips 14 may be sprayed with or coated with tricloromelomine, an FDA and EPA approved sanitizer, to help eliminate the ammonia in the manure and avoid other diseases that are common in poultry barns.

After completion of one or more bird growing cycles, depending upon the amount of accumulation of manure waste on chips 14, the spent chips 14 and the manure collected thereon are quickly and easily removed from floor 10 by way of a vacuum device 20, or alternatively by a front end loader, such as a Bobcat. The chips and manure waste from vacuum device 20 or front end loader may be fed into to a water wash tank 22. The water in that tank will be aerated for a period of about three to four minutes to create enough turbulence to wash off all the poultry manure waste which has accumulated on chips 14. Air flow into the tank 22 is then stopped to discontinue the aeration process and thus allow the manure solids to settle to the bottom of the tank and the chips to float to the top of the tank. The chips are then vacuumed from the tank 22 via vacuum device 24 and placed into a second sterilizing tank 26 containing a liquid that will sterilize the chips, thus killing any bacteria remaining on the chips. After a period of time the chips 14 are then removed from tank 26 by a vacuum 28 and placed into a drying tank 30 where they are dried using fans. After a period of time, the cleaned and sanitized chips 14 are removed from tank 30 and are either stored or returned to the poultry barns to be reused as bedding.

The manure waste which has settled on the bottom of tank 22 is removed from the tank and is then suitably treated so that it may be used as fertilizer to be spread in the farmer's fields.

As an alternative to cleaning and recycling the spent chips 14 removed from floor 10 by vacuum device 20, those chips may be conveyed to a suitable combustion chamber 40 in which the chips and manure collected thereon are burned at an extremely hot temperature to produce steam which drives a generator 42 for producing electricity.

From the description, it is apparent that the invention accomplishes the objectives and provides the advantages set forth hereinabove. The use of the polystyrene chips produces healthier birds and more birds which are disease free. The lightweight polystyrene chips are easier and quicker to handle and may be conveniently conveyed by the use of blowers and vacuum devices. The chips may be cleaned and recycled which not only reduces cost but also substantially reduces the amount of waste which has to be deposited on the farmer's fields. This substantially reduces the amount of contamination in the fields and in nearby streams and water sources. Being able to burn the spent polystyrene chips and the manure collected thereon to generate electricity at an economical rate is highly advantageous in itself, and it also reduces the amount of waste to be deposited in the farmer's fields.

Thus, the invention as described enables the farmer to maintain his number of poultry barns and birds grown within those barns without increasing the amount of land required to handle the waste generated by those barns, while still complying with waste and land requirements established by governmental agencies.

While the invention has been described as employing a polystyrene chip 14 as shown in FIGS. 2, 3, and 4, it should be understood that polystyrene chips of other sizes and configurations may be employed without deviating from the spirit of the invention.

The foregoing relates to preferred exemplary embodiments of the invention, it being understood that other equivalent variants and embodiments thereof are possible within the spirit and scope of the invention, the latter being defined by the appended claims.

What is claimed is:

1. A method of applying a bedding on the floor of a poultry rearing barn comprising providing a plurality of lightweight expanded polystyrene elements, blowing those elements onto the floor of said barn to form said bedding at a sufficient thickness to cover said floor and to catch the manure droppings from birds which are reared in said barn, retaining said elements on said floor until such time as said elements are contaminated by said droppings, and removing said elements from said floor.

2. The method defined in claim 1, comprising separating the manure waste from said elements and returning those elements back to the barn for use as bedding.

3. The method defined in claim 2 wherein the waste is washed from said elements and the elements are sanitized and subsequently returned to the poultry rearing barn.

4. The method defined in claim 3, wherein the waste manure which is removed from said elements is subsequently used as fertilizer.

5. The method defined in claim 2, wherein the waste manure which is separated from said elements is subsequently used as fertilizer.

6. A method of applying a bedding on the floor of a poultry rearing barn comprising providing a plurality of lightweight expanded polystyrene elements, placing those elements onto the floor of said barn to form said bedding at a sufficient thickness to cover said floor and to catch the manure droppings from birds which are reared in said barn, retaining said elements on said floor until such time as said elements are contaminated by said droppings, removing said contaminated elements from said floor, and burning said contaminated elements as part of a process which produces electricity.

7. The method of claim 6, wherein the elements are blown onto the floor.

8. The method of claim 7, wherein said elements have a density of about 0.65 to 0.75 pounds per cubic foot.

9. The method of claim 6, wherein said elements have a density of about 0.65 to 0.75 pounds per cubic foot.

* * * * *